Sept. 8, 1959   J. P. DE BRIGARD ET AL   2,902,745
APPARATUS FOR MAKING MASONRY STRUCTURES
Filed Dec. 12, 1955   3 Sheets-Sheet 1

INVENTORS:
Juan Pizano de Brigard
Quimet Brugues Angarita
BY Singer, Stern & Carlberg,
ATTORNEYS.

Sept. 8, 1959 J. P. DE BRIGARD ET AL 2,902,745
APPARATUS FOR MAKING MASONRY STRUCTURES
Filed Dec. 12, 1955 3 Sheets-Sheet 2
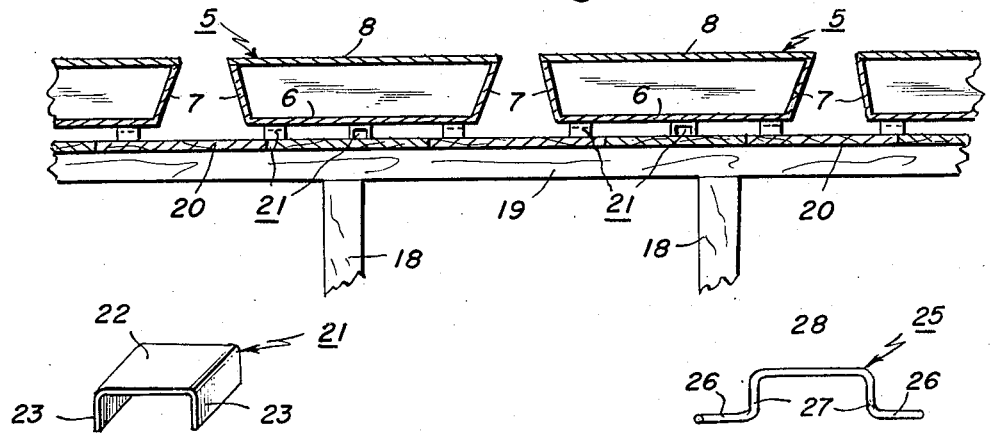
FIG. 8
FIG. 9 FIG. 10
FIG. 11
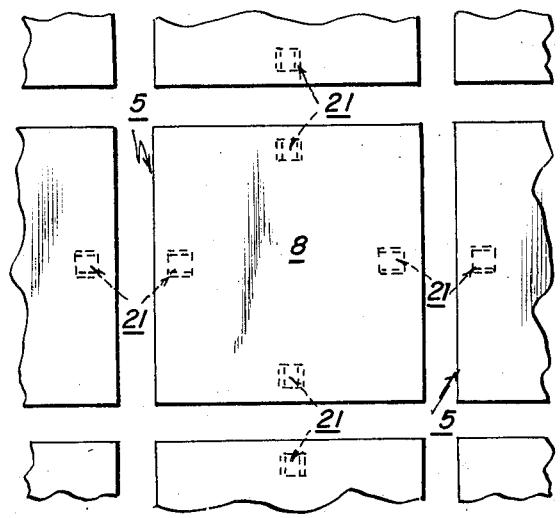
INVENTORS:
Juan Pizano de Brigard
Quimet Brugues Angarita
BY Singer, Stern & Carlberg
ATTORNEYS.

Sept. 8, 1959 J. P. DE BRIGARD ET AL 2,902,745
APPARATUS FOR MAKING MASONRY STRUCTURES
Filed Dec. 12, 1955 3 Sheets-Sheet 3
FIG 12
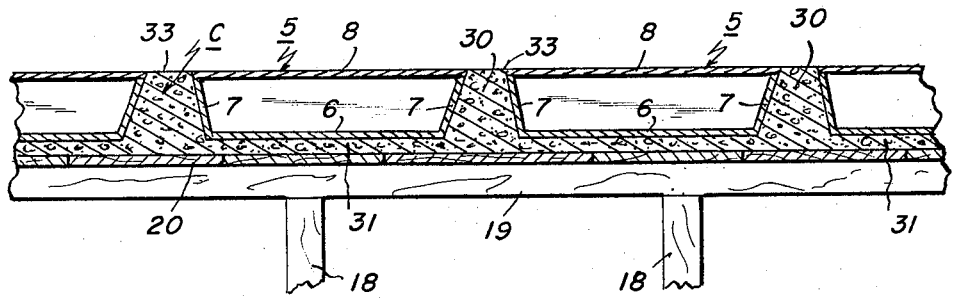
FIG. 13
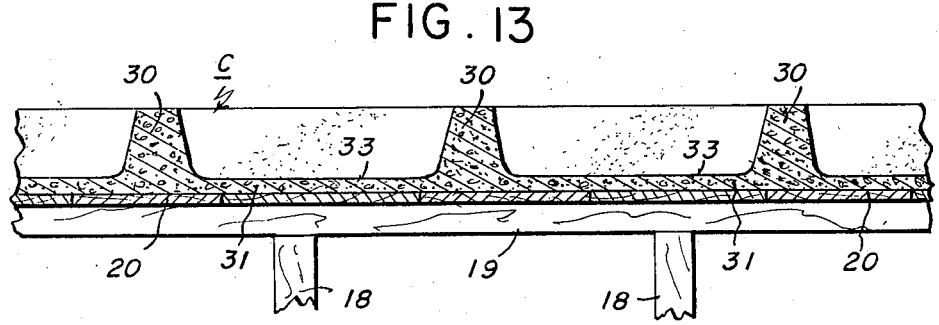
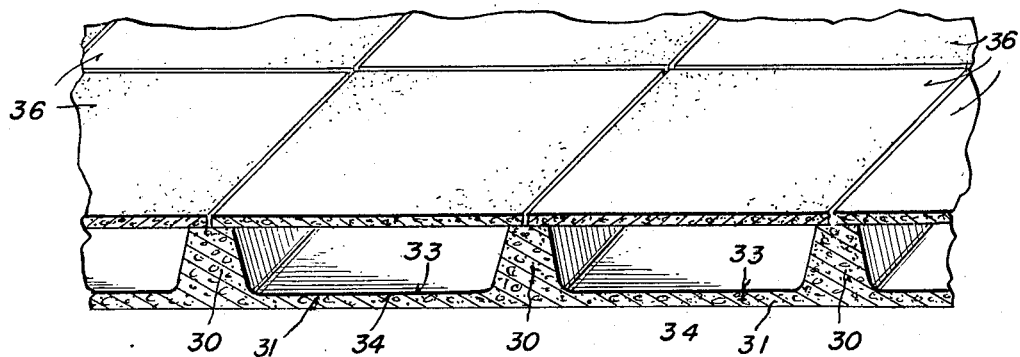
FIG. 14
INVENTORS:
Juan Pizano de Brigard
Quimet Brugues Angarita
BY Singer, Stern & Carlberg
ATTORNEYS.

United States Patent Office 2,902,745
Patented Sept. 8, 1959

2,902,745

APPARATUS FOR MAKING MASONRY STRUCTURES

Juan Pizano de Brigard and Quimet Brugues Angarita, Bogota, Colombia

Application December 12, 1955, Serial No. 552,535

3 Claims. (Cl. 25—131.5)

The present invention relates to an apparatus for making masonry structures, and more particularly to a molding apparatus for making concrete floors.

It is an object of the invention to provide a molding apparatus including a series of hollow sectional mold units adapted to be fastened together in closely spaced relation and supported in spaced relation from a floor form so that when the concrete is poured the form may be removed and the sectional mold forms can easily be removed individually, and assembled on the next floor for molding purposes while the first floor is setting.

Another object is to provide a mold formed of a series of sectional hollow units, each of which is shaped like the frustrum of a pyramid and inverted such that the smaller end is lowermost and thus enable the individual forms to be removed with ease and facility.

Another object is to provide a mold form for masonry work which includes a series of sectional hollow mold form units, each of which is provided with sliding handles at the corners thereof to enable the same to be equally lifted out of position when the concrete has been poured and set between the various hollow forms.

Another object is to provide a mold form for masonry work comprising a series of hollow units adapted to be connected together in spaced relation so that when the concrete is poured, the units will not be displaced from their original pattern and a molded floor will be formed with the cavities in the upper face thereof.

Other objects and advantages of the invention will become apparent during the course of the following description of the accompanying drawings, wherein:

Figure 8 is a fragmentary vertical cross-sectional view showing the manner in which the mold form units are supported prior to the pouring of the concrete.

Figure 9 is a perspective view showing one of the supporting members.

Figure 10 is a perspective view showing a slightly modified form of supporting member which can be optionally used.

Figure 11 is a top elevational view showing the manner in which the supporting elements are arranged for supporting the individual forms.

Figure 12 is a vertical cross-sectional view through a floor area showing the individual forms in position and the concrete poured therearound.

Figure 13 is a fragmentary vertical cross-sectional view similar to Figure 12, but showing the individual hollow forms removed, and Figure 14 is a perspective view showing the manner in which concrete floor slabs are placed in position on the molded structure to form a complete floor and ceiling structure.

Figure 1:
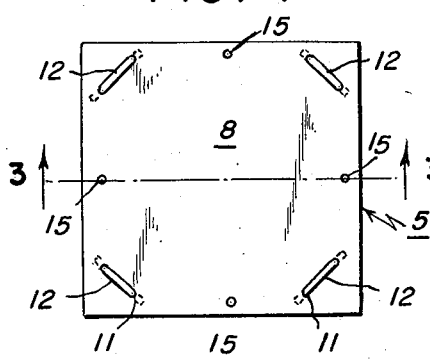
Figure 1 is a top elevational view of one of the hollow forms or units.
Figure 2:
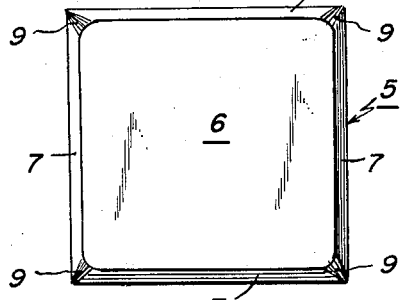
Figure 2 is a bottom elevational view showing the manner in which the corners are rounded of the individual mold forms or units to assist in removal thereof.
Figure 3:
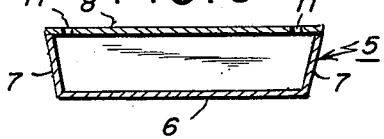
Figure 3 is a vertical cross-sectional view taken on line 3—3 of Figure 1 and looking in the direction of the arrows to illustrate the sectional shape of each unit.
Figure 4:
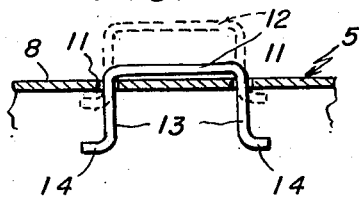
Figure 4 is an enlarged fragmentary view of a corner portion of one of the mold form units showing a handle slidably supported in the mold unit.
Figure 5:
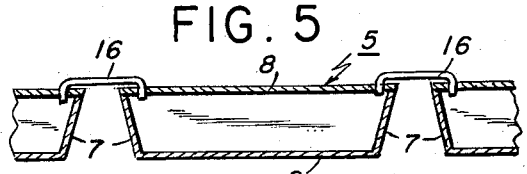
Figure 5 is a vertical fragmentary cross-sectional view showing the manner in which adjacent mold form units are connected together.

In the drawing, and more in detail, there is shown in Figures 1 to 7 inclusive a hollow metal mold form generally designated 5, and said hollow mold form unit 5 includes a bottom wall 6, side walls 7 and a top wall 8. The side and bottom walls are joined together and at the corners (Fig. 2) the side walls are rounded as at 9 to facilitate easy removal of the individual forms. Each of the mold form units 5 is shaped like the frustrum of a pyramid and inverted so that the smaller portion is lowermost as shown in Figures 3 and 5.

Each of the mold form units 5 is provided in the top wall 8 with sets of openings 11 arranged obliquely as shown in Figure 1 for slidably receiving a wire handle 12 or similar bail member. The handle members 12 are each formed of wire bent to provide downwardly extending leg portions 13 which are slidably received in the openings 11 and terminate in foot portions 14 which are larger than the openings 11 to prevent the passage of said foot members through said openings.

Figure 6:
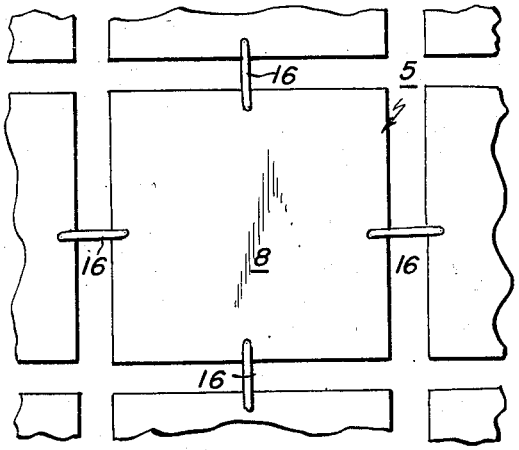
Figure 6 is a top fragmentary elevational view showing the manner in which a series of said mold forms are connected together.
Figure 7:
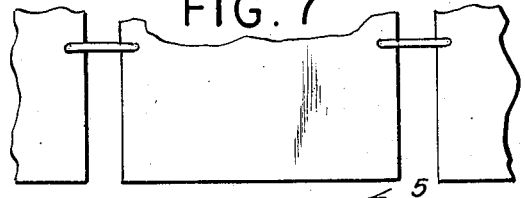
Figure 7 is a top elevational view showing the manner in which the mold form units may be connected together along only two edges.
Figure 7:
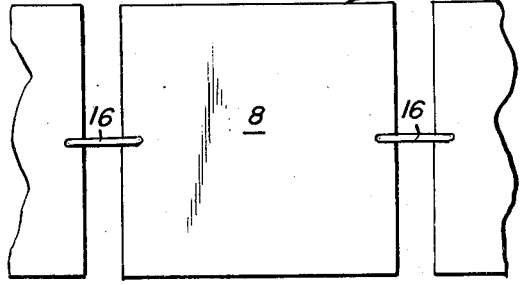

Also, each of the individual hollow form units 5 is provided in its top wall 8 with openings 15 which are adapted to receive wire spacing members 16 as shown in Figures 5 to 7 inclusive. In certain constructions, it may be desirable to secure and space the individual form units in both directions as shown in Figure 6 or only in one direction as shown in Figure 7.

The mold forms 5 are completely enclosed and are preferably formed of metal so that they will be sufficiently rigid to retain their shape during the molding operation.

A floor may be constructed on the ground by supporting the form units in spaced relation as shown in Figures 5 and 6. The space between the units is then filled with concrete which is permitted to set, after which the form units are removed and suitable slabs are placed on the upper portion of the casting to provide a suitable base floor. Uprights for columns 18 are then suitably supported on the thus formed floor and arranged in spaced relation so that they may be connected at their upper ends by means of beams 19 such as 2 x 8 rafters or the like. The rafters 19 are supported on suitable centers in spaced relation, and supported on the rafters is a plurality of form boards 20 placed in proper relation and closely together as shown in Figures 12, 13 and 14. The individual form units 5 are then supported on the floor forms 20 in spaced relation therefrom as shown in Figure 8. This is accomplished by providing spacing members generally designated 21 of channel section having a backing portion 22 and downwardly extending leg portions 23. The spacing members 21 are arranged in sets of four as shown in Figure 11 with the leg portions 23 extending downwardly and the connecting flat portion 22 uppermost to form a rest for receiving the bottom walls 6 of the individual mold form units 5.

The optional form of spacing member shown in Figure 10 is formed of a piece of wire, and generally designated 25. The wire is bent to provide foot portions 26 which extend in opposite directions in parallel offset planes spaced apart one from the other. The foot portions 26 are provided with upstanding leg portions 27 and said leg portions are connected by an oblique portion 28 extending between the two offset planes coinciding with the foot portions 26. The wire rod type spacing member 25 may be positioned in substantially the same relationship with respect to the individual form units 5 so that they are placed one adjacent each edge of the lower wall 6 thereof.

After the individual mold form units have been arranged as shown in Figure 8 in spaced relation one from the other by means of the connectors 16 being received in the openings 15, the concrete is poured as shown in Figure 12 so that it passes between the side walls 7 of the individual form units and when set provides ribs 30 of tapered section. The concrete also finds its way beneath the sections or form units and provides a wall portion 31. The concrete C may be of the appropriate mixture of cement and aggregate and is preferably of a type having normal setting qualities.

When the concrete C has set and hardened, the individual mold form units 5 are removed by grasping the handles 12 and exerting an upward pull thereon. When all of the individual form units have been removed as shown in Figure 13, there is provided a series of cavities 33 which are shaped identical to the mold form units 5. The concrete C is poured just flush with the top walls 8 of the mold form units so that the form units can be easily removed, and since all of the top walls 8 are in substantial alignment and lie in the same plane, the upper surfaces 33 of the ribs 30 will be substantially level and in horizontal alignment one with the other.

After the concrete C has become sufficiently set over a period of 48 hours or more, the uprights 18 and supporting framework is removed including the beams 19 or the like, as well as the form boards 20. When the form boards 20 have been removed, the surface 34 will be smooth and can be painted or otherwise treated to form a ceiling of the lowermost floor.

The floor surface for the casting 30—31 is formed of a series of pre-cast concrete slabs 36 which are of a square shape and are of a dimension so that the joint will center on the upright ribs 30 and be supported on the upper surface 33 thereof. If desired, the concrete slab 36 can be covered with suitable composition flooring tile or may be treated in any approved manner. However, the flooring slabs 36 are pre-cast to dimensions as set forth above such that they will extend slightly beyond the upper edges of the concrete beyond the cavities 33 and will meet in centered relation on the ribs 30. It has been found that prefabricated slabs 36 can be made of concrete having inset particles or stones resembling terrazo work, and that one surface of the cast slab may be finished to form a floor surface, while the remaining surfaces remain substantially rough.

The forms 5 are of uniform dimensions and as shown in Figures 1 and 2 are square in elevation. Thus, the cavities 33 are likewise of uniform dimensions and are shaped corresponding to the shape of the forms 5.

The floor board form is preferably provided with a smooth surface, but if desired can be provided with ornamental forms so that the ceiling will likewise carry a similar decoration when the floor board mould forms are removed.

The form members 5 may be made of various types of metal and if desired for lightness, aluminum may be used.

Before the concrete is poured, suitable reinforcing bars may be placed between the adjacent side walls of the form members so that the finished concrete floor structure will resemble a series of crossed beam-like members having reinforcing bars extending therethrough.

It has also been found that the various form members can be held in place with respect to a horizontal plane by placing a series of wire reinforcing rods across the tops thereof which can easily be removed, and are merely intended to hold the forms against vertical movement when the concrete is poured.

The board platform or board floor form may be constructed in any approved manner such that it can be easily removed from the underside of the concrete casting. This can be accomplished by other means besides metal or wooden beams braced by upright supports and the form shown is merely for the purpose of illustration. Also, in certain structures it may be desirable to leave a space in the board form for various decorative effects such as a capital or the like on the upper end of a column or upright.

Other types of floor covering can be provided, but it has been found most practical to fabricate floor slabs of uniform dimensions which will fit the casting so that their edges will be centered on the crossed beam-like members. This is accomplished by making the dimensions of the pre-fabricated floor slabs 2½ or 3 inches longer at each edge than the top surface of the floor form. Thus, for instance, if each floor form were 2 feet square, the overall dimensions of the floor slab would be 2½ feet square.

It is to be understood that the form of the invention herewith shown and described is to be taken as a preferred embodiment thereof and that various changes in the shape, size and arrangement of parts may be resorted to without departing from the spirit of the invention or the scope of the subjoined claims.

What we claim is:

1. In an apparatus for making concrete floor structures to form a floor and ceiling in which the floor surface has formed therein a plurality of equidistantly spaced cavities forming a waffle-like pattern throughout said surface, comprising a series of hollow closed metal form members having bottom walls and the shape of a frustrum of a pyramid arranged in inverted relation and equidistantly spaced one from the other, said form members being spaced above a suitable board form having an upper portion to provide a clearance space between the upper portion of said board form and the bottom wall of said form members, the top wall of each of said form members being provided with openings adjacent the side edges of said form members and arranged intermediate the corners of said form members, and U-shaped wire fastener elements the leg portions of which are adapted to be received in said openings in the top wall of each form member to hold said form members in equidistantly spaced apart relation against lateral displacement in horizontal directions at right angles one to the other, and handle members adjacent each corner edge on the top wall of each form member, said handle members being in the form of a bail with straight parallel portions received in openings in the top wall of said form members with their lower ends bent outwardly to limit upward movement of said bail handles when the form members are removed from a position above the concrete after the same has been poured and set around said forms and in the space therebeneath.

2. In a apparatus for making concrete floor structures to form a horizontal wall having an upper floor portion and lower ceiling portion in which the floor surface has formed therein a plurality of equidistantly spaced cavities resembling a waffle-like pattern throughout said surface, comprising a series of hollow closed metal form members shaped similar to the frustrum of a pyramid and arranged in inverted relation and equidistantly spaced one from the other and from a floor board surface, the top wall of each of said form members being provided with openings adjacent the side edges and arranged intermediate the corners of said form members, U-shaped wire fastener elements having leg portions adapted to be received in said openings in the top wall of each form member to hold said form members in properly spaced relation against lateral displacement in horizontal directions at right angles to one another, and bail handle members adjacent each corner edge on the top wall of each form member, said bail handle members having straight parallel portions received in openings in the top wall of said form members with their lower ends bent outwardly to limit upward movement of said bail handles when the form members are removed after the concrete has been poured therearound and therebeneath, said form members being adapted to be removed from a position above said floor structure after the concrete poured in the spaces between said floor members has set.

3. In an apparatus for making concrete structures to form a horizontal wall having an upper floor portion and a lower ceiling portion in which the floor portion has formed therein a plurality of equidistantly spaced cavities resembling a waffle-like pattern throughout its surface, comprising a series of hollow closed metal form members shaped similar to the frustrum of a pyramid and arranged in inverted relation and equidistantly spaced one from the other, said form members being adapted to be supported on a board form surface, a plurality of channel-shaped spacer elements arranged beneath each form member to space the lower wall of each form member an equal distance above said board form surface, the top wall of each of said form members being provided with openings adjacent the side edges and arranged intermediate the corners of said form members, U-shaped wire fastener elements having leg portions adapted to be received in the openings in said form members to retain said form members in equidistantly spaced apart relation against lateral displacement in horizontal directions at right angles to one another, and bail handles having parallel leg portions slidably received in openings adjacent the corners of each form member with the lower portions bent laterally to limit upward movement of said bail handle when the concrete form members are removed after the concrete has been poured and set, said handles being arranged to permit the form members to be removed from the set concrete from a position above said wall structure while leaving the channel-shaped spacing members embedded in the set concrete.

References Cited in the file of this patent

UNITED STATES PATENTS

| | | |
|---|---|---|
| 1,598,840 | Zucco | Sept. 7, 1926 |
| 1,667,701 | Luedke | Apr. 24, 1928 |
| 1,690,864 | Kleitz | Nov. 6, 1928 |
| 2,268,311 | Sheehan | Dec. 30, 1941 |
| 2,401,121 | Thoresen | May 28, 1946 |
| 2,484,520 | Mathis | Oct. 11, 1949 |
| 2,539,741 | Hayes | Jan. 30, 1951 |
| 2,550,627 | Walter | Apr. 24, 1951 |

FOREIGN PATENTS

| | | |
|---|---|---|
| 105,471 | Australia | Oct. 12, 1938 |
| 492,402 | France | Mar. 18, 1919 |
| 473,458 | Italy | July 30, 1952 |